United States Patent [19]

Nickel et al.

[11] Patent Number: 4,819,779
[45] Date of Patent: Apr. 11, 1989

[54] CENTRIFUGAL CLUTCH

[75] Inventors: Hans Nickel, Cottenweiler; Michael Wissmann, Schorndorf-Weiler; Horst Scholz, Adelberg, all of Fed. Rep. of Germany

[73] Assignee: Andreas Stihl, Waiblingen, Fed. Rep. of Germany

[21] Appl. No.: 36,016

[22] Filed: Apr. 8, 1987

[30] Foreign Application Priority Data

Apr. 8, 1986 [DE] Fed. Rep. of Germany ....... 3611694

[51] Int. Cl.$^4$ ............................................. F16D 43/18
[52] U.S. Cl. .............................. 192/105 BA; 192/76; 192/109 R
[58] Field of Search ......... 192/105 BA, 103 B, 104 B, 192/105 BB, 76, 109 R

[56] References Cited

U.S. PATENT DOCUMENTS

1,689,913 10/1928 Carrey ........................ 192/105 BA
4,625,849 12/1986 Gommel ...................... 192/105 BA Primary Examiner—Rodney H. Bonck
Assistant Examiner—Richard M. Lorence
Attorney, Agent, or Firm—Walter Ottesen

[57] ABSTRACT

A centrifugal clutch for use especially in a motor-driven chain saw. The clutch includes a carrier which is provided for attachment to a drive shaft and on which radially moveable centrifugal weights are mounted. The weights can move radially outwardly under centrifugal force and counter to spring force and come into contact engagement with the drum which is the output end of the clutch. A restraining device is provided between each centrifugal weight 2 and carrier 1 so that the engagement of the clutch does not occur until after an elevated speed has been reached. Disengagement of the clutch occurs as in known clutches somewhat above the idling speed. The restraining device is configured so that it does not clear the outward path of the centrifugal weight until a certain minimum centrifugal force has been exceeded. This has the effect that the clutch engages suddenly at mid range speeds and can transmit a very high initial torque to the output tool driven through the clutch.

8 Claims, 4 Drawing Sheets

FIG. 9

CENTRIFUGAL CLUTCH

FIELD OF THE INVENTION

The invention relates to a centrifugal clutch especially for a motor-driven chain saw. The centrifugal clutch includes a clutch drum arranged in surrounding relationship to a carrier upon which centrifugal weights are mounted so as to be displaceable in the radial direction. The carrier is rotatable about an axis of rotation and the centrifugal weights are held against movement in the direction of the axis.

BACKGROUND OF THE INVENTION

Centrifugal clutches of this type are used in portable apparatus and especially in apparatus driven by an internal combustion engine, such as motor-driven chain saws, in order to keep the tool such as a saw chain from being driven when the motor is idling. This makes it possible to put the apparatus down safely during work pauses without having to turn off the motor. When the work is resumed, the motor is accelerated, which engages the centrifugal clutch and the tool and the drive unit are reconnected to one another.

U.S. Pat. No. 4,625,849 shows a coupling of this type. The clutch described in this patent comprises a carrier which is provided for attachment to the drive shaft and on which carrier three jaw-like centrifugal weights are arranged in such a manner that they can be radially displaced. A tension spring is located approximately tangentially between each two centrifugal weights. The springs bias the centrifugal weights into their rest positions in the vicinity of the rotational axis of the carrier. The centrifugal weights are surrounded at a small spacing by a drum which forms the output part of the clutch and which is provided for a drive connection with the part for driving a tool, for example, the drive sprocket of a chain saw. Centrifugal weights and tension springs are designed in such a manner that the centrifugal weights are biased by the pull force of the springs in their position in the vicinity of the rotational axis when the motor is idling. As the speed of the motor increases, the centrifugal weights move outwardly because of centrifugal force counter to the spring force until they frictionally engage the surrounding clutch drum so that the drive connection between motor and tool is established. The centrifugal weights and clutch drum disengage in a corresponding manner as the motor speed decreases.

A disadvantage, especially in the case of motor-driven chain saws equipped with the described clutch, is the fact that once the saw chain has become stuck in the wood being cut, it can no longer be freed by means of its own drive since as a rule the torque available when the centrifugal clutch is engaged is not sufficient and the clutch slips. The chain therefore usually has to be freed by removing the restraint mechanically such as by inserting a wedge. This takes time and has an adverse effect on the work to be performed. Also, the apparatus is exposed to unnecessary mechanical stresses which increase the wear of the tool driven via the clutch and drive unit.

SUMMARY OF THE INVENTION

In view of the above, it is an object of the invention to provide a centrifugal clutch wherein engagement occurs suddenly at an increased speed while disengagement occurs, as is customary, just above the idling speed.

The centrifugal clutch of the invention avoids the above-mentioned disadvantages since the restraining device blocks the outward path of the centrifugal weights so that an engagement of the centrifugal clutch does not occur until an increased speed is attained, for example in the mid-speed range. After the restraining device has been overcome by centrifugal force, this restraining device no longer inhibits the further outer movement of the centrifugal weights, so that the clutch is suddenly engaged, which makes it possible to immediately transfer a very high torque. As a rule, a high torque is available on the motor side of the clutch at mid-range speeds and, in addition, there is the moment of inertia present on account of the moved masses. This high torque on the drive side of the clutch is transferred directly to the output side thereof, so that in the above-mentioned instance the saw chain can be freed without additional auxiliary means.

The use of the centrifugal clutch of the invention in a motor-driven chain saw is cited only by way of example. Many other areas of application are possible, since the problems initially described occur in many machines such as lawn mowers, hedge shears, et cetera. The restraining device also provides that the apparatus remains ready for operation at low speeds, that is, below the speed at which the clutch engages. This is so because the restraining device is designed in such a manner that it only clears the path of the centrifugal weights in the outward direction after a minimum force has been overcome and is then virtually inactive until the clutch disengages. Stated otherwise, with the clutch already engaged, the clutch does not disengage before speeds near idle are reached.

In contrast to stronger tension springs, this affords the advantage that the frictional engagement within the clutch between drive and output after engagement is approximately as great as that of a conventional clutch at this speed. Since the restraining device is inactive down to the disengaging speed as the speed drops, the tool can be operated economically even in the low speed ranges, for example, slightly above the idling speed of the motor.

BRIEF DESCRIPTION OF THE DRAWINGS

The invention will now be described with reference to the drawings wherein:

FIG. 8 shows a view of a modified embodiment of a centrifugal clutch of the invention; and, FIG. 9 shows a section along line IX—IX of FIG. 8 on an enlarged scale.

DESCRIPTION OF THE PREFERRED EMBODIMENTS OF THE INVENTION

Figure 1:
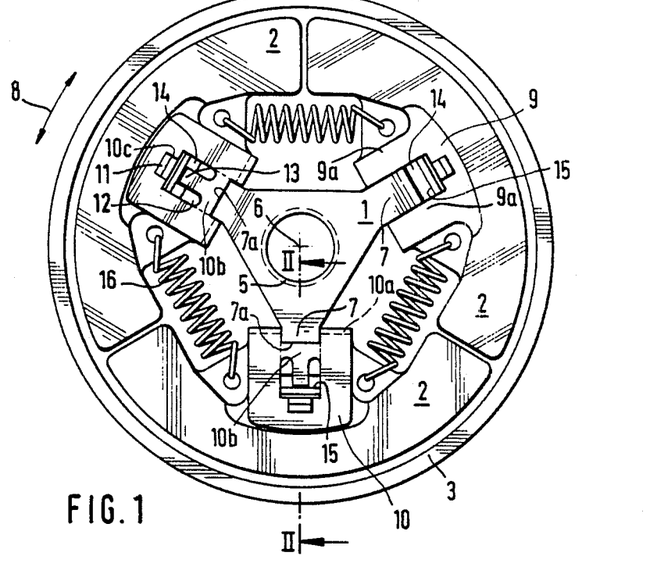
FIG. 1 is a plan view of a centrifugal clutch according to a preferred embodiment of the invention.
Figure 2:
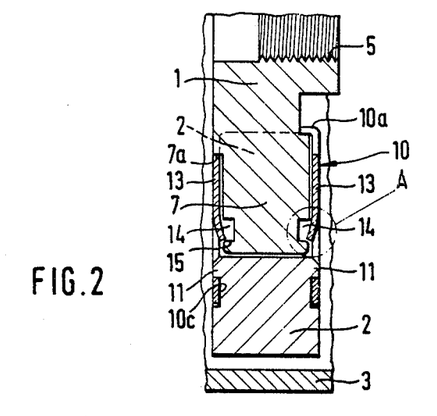
FIG. 2 shows a section along line II—II of FIG. 1 on a slightly enlarged scale.
Figure 4:
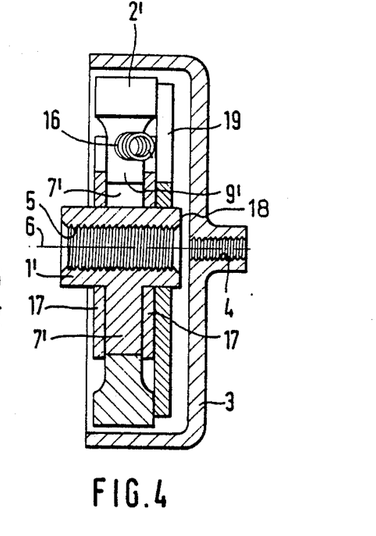
FIG. 4 shows a section along line IV—IV of FIG. 3.

The centrifugal clutch shown in FIGS. 1 and 2 includes a carrier 1 with three radially extending arms 7, on each of which one of three centrifugal weights 2 with a bifurcated projection 9 is mounted so as to be movable in the radial direction. Centrifugal weights 2 are curved jaws symmetrical to projection 9 and form, considered together, a cylindrical surface which is provided for contact engagement with a likewise cylindrical inner circumferential surface of a clutch drum 3. Clutch drum 3 forms the output-end part of the centrifugal clutch and includes, as shown in FIG. 4, a threaded bore 4 with which it can be fastened to an output shaft (not shown). Carrier 1 includes threaded bore 5 which is provided for fastening to a drive shaft (not shown). Drive shaft and output shaft have a common axis of rotation 6.

In the built-in condition, for example in a motor-driven chain saw, carrier 1 is seated in a fixed manner with its threaded bore 5 on one end of the drive shaft connected to the drive motor and clutch drum 3 is fixedly seated with its threaded bore 4 on one end of the output shaft on which a sprocket is mounted for driving the saw chain. In the disengaged position of the centrifugal clutch shown in FIGS. 1 and 2, the drive part and output part of the apparatus are completely separated from each other.

Centrifugal weights 2 are secured against axial shifting by holders 10. In FIG. 1, the arm 7 of carrier 1 and the bifurcated projection 9 of the centrifugal weight 2 are shown without the holder 10 so that the journalling of the weight 2 on arm 7 can be seen with greater clarity. Arms 7 of carrier 1 have a rectangular section so that the centrifugal weights 2 are guided on four sides of the arm. Each arm 7 is encompassed on its two sides extending transversely to the direction of rotation 8 by two legs 9a of projection 9 of centrifugal weight 2. Legs 9a, when measured in axial direction 6, have approximately the same thickness as arms 7. The inner surfaces of legs 9a slide on the outer surfaces of the arms 7.

The radially inward displacement of each centrifugal weight 2 is limited by stop surface 7a which coacts with holder 10. The outward path of centrifugal weights 2 is limited by clutch drum 3. During the motion between their inner or rest position (FIG. 1) and their outer or active position (engaged position) and vice versa, centrifugal weights 2 are guided radially by legs 9a of bifurcated projections 9 and by the arms 7. The holders 10, which are U-shaped in section, prevent the centrifugal weights 2 from being shifted in the axial direction 6 of the centrifugal clutch. Holders 10 consist of spring steel and engage legs 9a and the crosspiece of the bifurcated projection 9 at the end faces of the projection lying in respective radial planes. Crosspiece 10a of the holder connecting the two holder legs thereof is slotted in the middle and rests laterally on the arm 7 associated therewith. A connecting piece is formed on each of the two holder legs by the slot with one connecting piece 10b functioning as a counterstop for stop 7a, which is formed by a step of arm 7. Each of the two holder legs conjointly define a central recess 12 into which a resilient tongue 13 extends from crosspiece 10b.

The holders 10 are connected in a form-tight manner to centrifugal weights 2 by two catch noses 11 formed on the crosspieces of bifurcated projections 9 of centrifugal weights 2. The holders 10 are slid onto corresponding ones of the arms 7 of carrier 1 prior to mounting the centrifugal weights 2. During the subsequent insertion of the centrifugal weights, their catch noses 11 engage in opening 10c provided in the outer connecting pieces of the holder which bridge recesses 12. The catch noses 11 are beveled, as is shown in FIG. 2, in order to facilitate sliding on the U-shaped holder 10. The described arrangement guides centrifugal weights 2 in such a manner that they can be displaced only in a radial direction.

The two resilient tongues 13 of each holder 10 are bent on their free ends in the direction toward the particular arm 7 which here has a transverse groove 14 formed therein. As is shown in particular by FIG. 2a, spring tongue 13 extends into transverse groove 14 in such a manner that its end face is located in front of the radially outer, rounded-off groove wall 15. Accordingly, this position corresponds to the inactive position of the clutch (FIG. 1) in which centrifugal weights 2 are not in contact engagement with the clutch drum 3.

As is shown in FIG. 1, the centrifugal clutch includes three tension springs 16 in this embodiment which are positioned approximately tangentially and each of which is located between two mutually adjacent centrifugal weights 2. Tension springs 16 hold the centrifugal weights 2 in the position shown in FIG. 1 as long as the speed of carrier 1 does not exceed a predetermined value. In known clutches of this type, tension springs 16 are dimensioned in such a manner that centrifugal weights 2 make frictional engaging contact with the inside of clutch drum 3 at a certain speed, for example, somewhat above the idling speed of the motor, and thus establish the drive connection between the drive-end part and the output-end part of the apparatus.

Figure 2A:
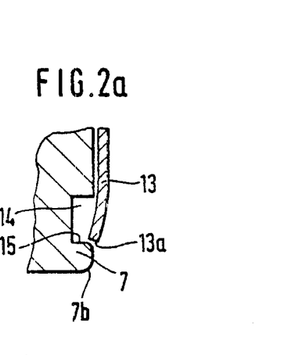
FIG. 2a shows a cut-out of FIG. 2 in area A on an enlarged scale.

In the centrifugal clutch of FIGS. 1, 2 and 2a, the pulling force of springs 16 is determined in a customary manner. Thus, when the predetermined speed is exceeded, which is somewhat above the idling speed of the motor, the centrifugal force is greater than the return-pulling force of springs 16. Nevertheless, and according to a feature of the invention, centrifugal weights 2 can not move radially outwardly at first because spring tongues 13 rest on corresponding ones of the groove walls 15 with their front end faces 13a. Thus, both parts 13, 15 conjointly define a restraining device. As the drive speed increases, the centrifugal force of centrifugal weights 2, which is now no longer compensated for by tension springs 16, rises until spring tongues 13 of holder 10 slide axially outward on the rounded-off edges of groove walls 15 and pivot out so far that they clear the radially outward path of centrifugal weights 2. Therefore, centrifugal weights 2 come into sudden and impacting contact engagement with clutch drum 3 after having overcome the restraining device under great centrifugal force; this instantly establishes a connection between drive and output which can transmit a considerable torque. Since tension springs 16 are dimensioned essentially like those in known centrifugal clutches, a transferrable torque is available after the restraining device has been overcome as would also be present in known clutches in this speed range. The restraining device can be designed for a predetermined engaging speed by selecting the spring constant for pull springs 16 and by a suitable constructive shaping of the front end face of spring tongues 13 and of groove wall 15.

If the drive speed is lowered with the clutch engaged, the clutch remains engaged, as is also the case with conventional centrifugal clutches, until shortly above the idling speed of the drive motor, since the restraining device is inactive with the clutch in the engaged state. If the speed and therewith the centrifugal force have dropped so low that the force of return pull springs 16 predominates, then centrifugal weights 2 slide with their bifurcated projection 9 radially inward on arms 7 so that spring tongues 13 slide onto radially outer, rounded-off edges 7b of arms 7 and are then drawn over the outer surface of the arms until they have again reached their initial position (FIG. 2). Thus, only the friction force of spring tongues 13 on arms 7 has to be overcome for the return movement. Accordingly, the speeds required for engagement and disengagement have different levels. The tension springs 16 do not have to be made much stronger than in customary centrifugal clutches since they only have to additionally overcome the relatively low frictional forces between spring tongues 13 and arms 7. For this reason, the transferrable torque is also not noticeably decreased in comparison with the customary centrifugal clutches.

The centrifugal clutch described above also affords the advantage that it can be used in both directions of rotation, as is indicated by double arrow 8 in FIG. 1. For a constructive configuration for one of the two directions of rotation, threaded bores 4 and 5 should be provided as right-hand threads or as left-hand threads. If the clutch is also intended for use in both directions, a suitable form-tight connection of a known configuration should be selected in lieu of threaded bores 4 and 5.

Figure 3:
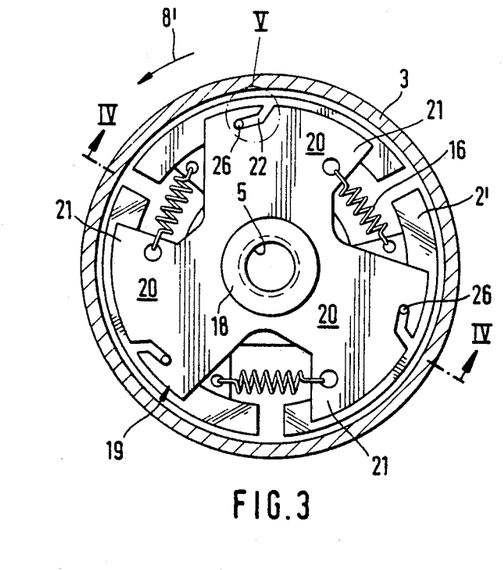
FIG. 3 shows a view of another embodiment of a centrifugal clutch of the invention.
Figure 5:
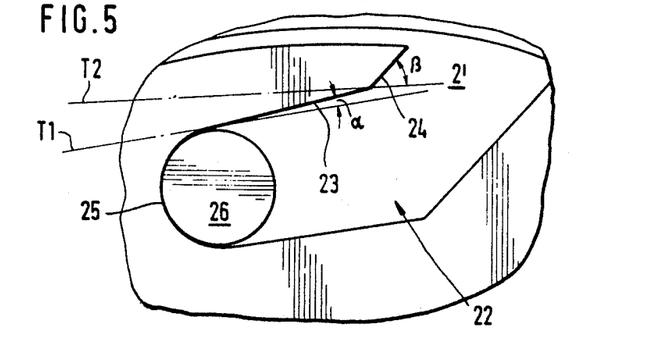
FIG. 5 shows the detail designated in FIG. 3 by V on an enlarged scale.

FIGS. 3 to 5 show another embodiment of a centrifugal clutch of the invention. The drive-end part of the clutch includes carrier 1' which has three arms 7' which are rectangular in cross section, as in the embodiment already described with reference to FIGS. 1 to 2a. A centrifugal weight 2' with its bifurcated projection 9' is slid onto each arm 7' so that the centrifugal weights are guided in a radial direction. In order to secure the centrifugal weights against axial displacement, two essentially triangular plates 17 flattened on the corners are provided which are fastened to the front end faces of arms 7' by gluing, welding or in a similar manner, the front end faces of arms 7' lying in radial planes. A cylindrical hub 18 of carrier 1' connects entrainment arms 7' to each other. This hub 18 is extended in the direction of axis 6 in the direction toward the bottom of clutch drum 3 and forms an axial guide for guide disc 19 which is rotatably journalled on hub 18 and lies against the one plate 17 (FIG. 4). Guide disc 19 has three segments 20 corresponding to the number of centrifugal weights 2' provided. The radially outer edges of the segments 20 are arranged on a circle concentric to clutch axis 6 and this circle has a smaller diameter than the outer periphery of centrifugal weights 2' (FIG. 3). Each segment 20 includes a projection 21 directed to the rear when viewed in relation to the direction of rotation 8'. The projection 21 has a bore for hooking in a tension spring 16 at one end thereof. The tension spring 16 is hooked with its other end in a bore of the adjacent centrifugal weight 2'. Guide slot 22 is provided in the region of the outer circumference of guide disc 19 in each segment 20 and has an open end terminating at the circular-arc like outer edge of the segment. The pin-slot guide means which includes this guide slot 22 is shown in detail in FIG. 5.

Pin 26 is attached to centrifugal weight 2' disposed behind the slot and engages the guide slot 22 as shown in FIGS. 3 and 5. In the position shown, which corresponds to the disengaged state of the clutch, pin 26 rests against inner arcuate slot edge 25 which forms a stop. The radially outer edge of the slot passes from edge 25 to segment 23 at first with only a slight incline referred to a tangent T1 applied at the transition point between edge 25 and the segment 23 with the angle α to this tangent being approximately 4°. The segment 23 merges into edge segment 24 which forms a greater angle β with tangent T2 at this transition point. In this embodiment the angle β is approximately 45°.

The two radially outer edge segments 23 and 24 conjointly define a guide track for the pin 26 corresponding thereto. The radially inner edge of slot 22 can run approximately parallel to segments 23 and 24; however, it can also have a different course. It is only necessary that pin 26 can pass along guide slot 22.

Centrifugal weights 2' are configured as wedges which contact engage the clutch drum 3 as in the embodiment of FIG. 1. Each pin 26 is located somewhat outside of the center of the centrifugal weight corresponding thereto and is disposed parallel to axis of rotation 6 of the clutch. Tension springs 16 hold the guide disc 19 in the rest position with stops 25 lying against pins 26. As is shown in FIGS. 3 and 4, springs 16 are placed essentially tangentially, but extend inclined from the outside inwardly, viewed in side elevation (FIG. 4), in such a manner that guide disc 19 is drawn by the spring force in the direction toward plate 17 and secured against an axial displacement in the direction toward the clutch drum 3.

When carrier 1' is driven, the centrifugal force acts on centrifugal weights 2' which, however, are not displaced radially at first even as the speed increases because segment 23 of the guide tracks, which is inclined only slightly to the outward direction, forms a restraint which prevents the pins 26 from sliding out of the guide slots 22. However, since segment 23 extends outwardly at an angle α of approximately 4° in relation to tangent T1, this track segment 23 has a radial component, so that the radial force transmitted by pins 26 to the guide disc 19 brings about a rotation of guide disc 19 about hub 18 in direction of rotation 8' as the speed increases further, this rotation being counter to the spring force of springs 16. The spring constant of springs 16 as well as the length and slope of guide track segment 23 are selected so that at a predetermined mid-range speed, the transition point between track segments 23 and 24 arrives at the pin 26 which then slides outwardly on the steeper track segment 24 with great acceleration in guide slot 22 which causes centrifugal weights 2' to move outwardly in an almost sudden manner and to entrain clutch drum 3 with frictional engagement and transmit a higher torque thereto. With respect to its engagement and disengagement behavior, the centrifugal clutch of FIGS. 3 to 5 corresponds essentially to the clutch described with reference to FIGS. 1 and 2. Thus, the contact engagement occurs at mid-range speeds and the subsequent contact disengagement does not occur until just above the idling speed, because pins 26 can slide back into guide slots 22 along track segments 24 in an unimpeded manner under the action of the tension springs 16 pulling on the centrifugal weights.

The guide slots 22 are configured so that pins 26 can not completely move out of slots 22 via inclined segment 24 of the track because centrifugal weights 2' come into contact engagement with clutch drum 3 before this can occur. Inclined segment 24 reinforces the action of tension springs 16, since this in conjunction with pins 26 causes a counterforce to the centrifugal force to be transmitted to centrifugal weights 2'. This radially acting auxiliary force assures that the clutch disengages again shortly above the idling speed. When centrifugal weights 2' move inwardly after disengagement, pins 26 move back into flatter part 23 of the guide slot 22; the guide disc 19 is then drawn back by the spring force of tension springs 16 into the position of FIG. 3 in which pins 26 rest on stops 25. In this embodiment, the restraining device is conjointly formed by guide disc 19, guide tracks 23, 24 and the pins 26 mounted on centrifugal weights 2'; because of this configuration, the restraining device is also here practically inactive after a predetermined force has been exceeded so that a high torque can be transmitted to the clutch drum. The inclinations of guide track segments 23 and 24 are calculated according to the basic rules of mechanics.

The engaging speed and the disengaging speed can be set almost as desired by an appropriate selection of the inclinations. A particular advantage of this embodiment is the fact that the engaging and disengaging speed can be changed by replacing guide disc 19 with a disc having another course of guide track (23, 24). Guide disc 19 is connected to the rest of the clutch only via tension springs 16 and can be exchanged with only a few manipulations. The direction of rotation 8' is preferably counter to the path direction of guide slot 22 as shown in FIG. 3, especially in the case of rapidly accelerating drive motors. An operation in the reverse direction of rotation is also possible and is dependent on the area of use.

Figure 6:
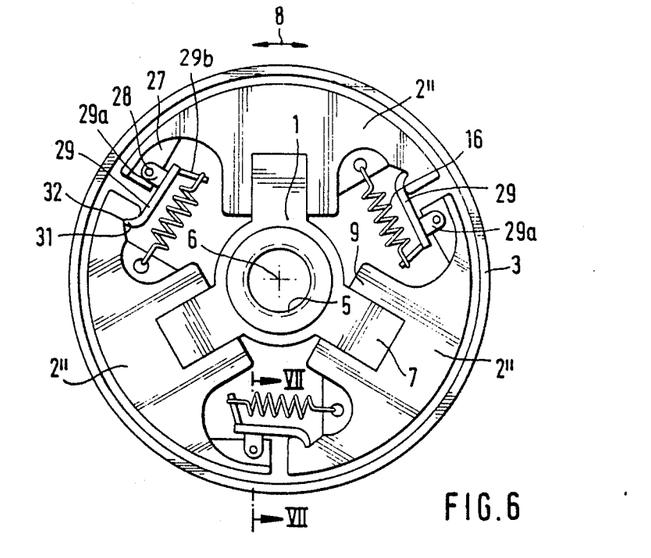
FIG. 6 shows a view of another embodiment of a centrifugal clutch of the invention.
Figure 7:
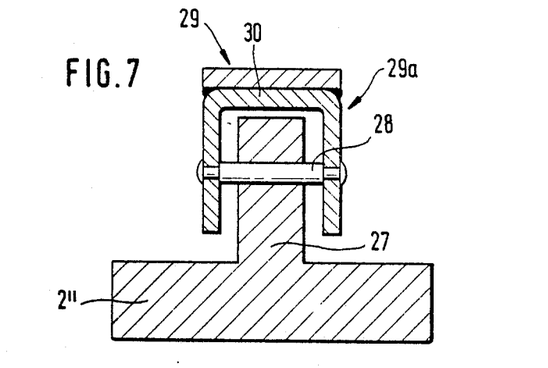
FIG. 7 shows a section along line VII—VII of FIG. 6.

FIGS. 6 and 7 show a third embodiment of a centrifugal clutch of the invention. This embodiment also corresponds in essence, with the exception of the restraining device, to the preceding embodiments. A carrier 1 with arms 7 is provided on the drive end and centrifugal weights 2" are journalled on corresponding ones of the arms so as to be slidable in the radial direction.

Centrifugal weights 2" encompass arms 7 with their bifurcated projections 9 by means of which they are guided radially. The holders which participate in the axial guidance of the centrifugal weights are not shown here. The axial guidance can be achieved as in the embodiments described above by means of two plates 17 (FIG. 4) or by holders each having a U-shaped section (FIGS. 1 and 2). The centrifugal weights 2" are likewise wedge-shaped above projections 9 and contact clutch drum 3 which is disposed in surrounding relationship to the weights.

As is shown in FIG. 6, each centrifugal weight 2" includes an extension 27 in the vicinity of the adjacent centrifugal weight. The extension 27 carries a pivot pin 28 on which lever 29 is pivotally journalled. The pivot axis of lever 29 is parallel to the axis of rotation 6 of the clutch. As FIG. 7 shows, bracket 29a, which is U-shaped in section, is rigidly fastened to lever 29 in the region of extension 27. The bracket 29a encompasses extension 27 as shown in FIG. 7.

Lever 29 includes an end piece 29b which projects out over the base 30 of bracket 29a. This end piece 29b extends approximately tangentially in toward centrifugal weight 2" on which the lever 29 is itself pivotally mounted. Tension spring 16 is fastened to end piece 29b and the other end of the spring is hooked in a bore on the inner side of adjacent centrifugal weight 2". The other end of the lever 29 comprises a radially outwardly directed nose 31 which is approximately prismatic in shape and engages into a corresponding recess or nitch 32 in the radially inwardly facing edge of adjacent centrifugal weight 2".

Recess 32 and nose 31 are each configured in such a manner that the radial outward travel of centrifugal weights 2" is restrained at first by spring-loaded lever 29. The contact engagement of the centrifugal weights with the clutch drum by means of a radial displacement of the weights is not possible until the centrifugal force has increased to the point at which the restraint formed by the respective pairs of lever noses 31 and recesses 32 has been overcome. When this restraint is overcome, noses 31 of lever 29 slide out of recesses 32 along arcuate guide surfaces of the centrifugal weights adjacent to the recesses and the levers are pivoted counter to the spring force of respective springs 16. This causes centrifugal weights 2" to be suddenly moved radially outward, so that the connection between drive part and output part of the clutch is established.

As the speed drops, this clutch also behaves like the embodiments described above because the noses 31 can not reengage into recess 32 until centrifugal weights 2" are moved radially inwardly. Since levers 29 do not completely leave the curved guide surfaces of centrifugal weights 2" with their noses 31, their return along these guide surfaces under the force of tension springs 16 is readily possible as soon as the speed has decreased to the point that the spring force is greater than the centrifugal force. This is set to be just above the idling speed of the motor. However, another disengagement speed can also be selected.

The embodiment of FIGS. 6 and 7 is suitable for operation in both directions of rotation 8.

Figures 8, 9:
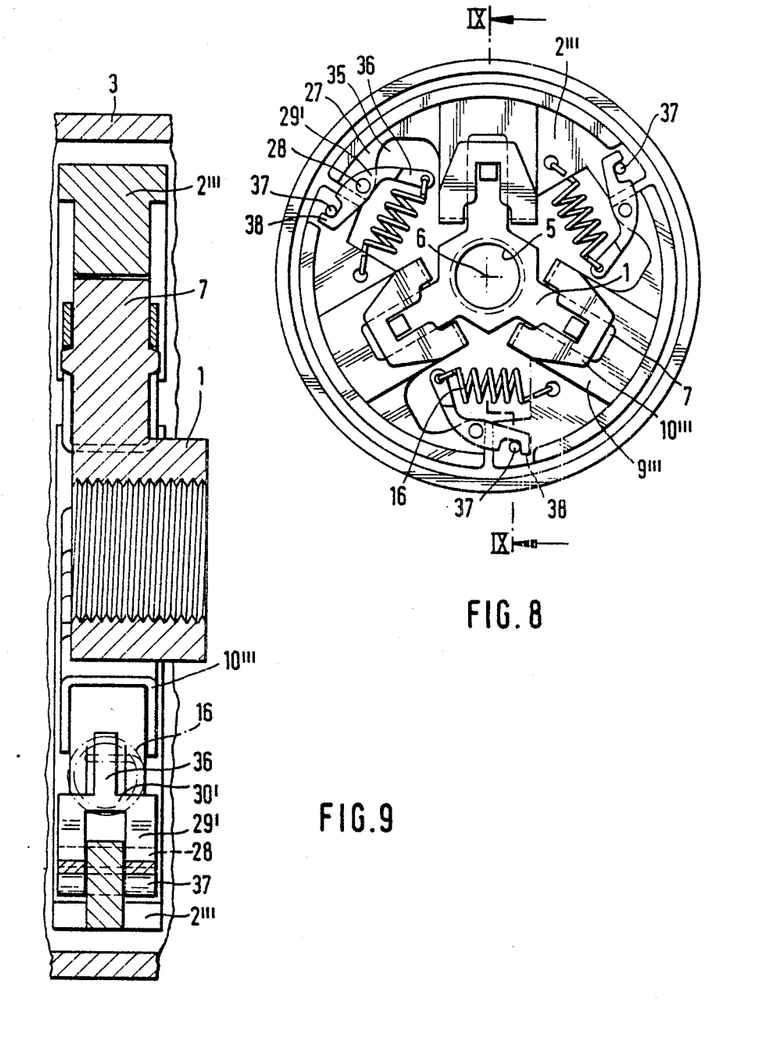

FIGS. 8 and 9 show another embodiment in which spring-loaded levers 29' are provided in a manner similar to the embodiment of FIGS. 6 and 7. Centrifugal weights 2''' are guided with bifurcated extensions 9''' on arms 7 of carrier 1. U-shaped spring holders 10''' are provided for securing centrifugal weights 2''' against displacement in the direction of axis 6 in a manner similar to the embodiment of FIGS. 1 and 2. However, guide plates 17 as in FIG. 4 can also be used. Levers 29' are pivotally mounted on extensions 27 by means of respective pivot pins 28. Levers 29' are approximately U-shaped in section as shown in FIG. 9 and encompass extension 27 on which they are pivotally journalled. The two legs of each U-shaped lever 29' are located on respective sides of the extension 27 corresponding thereto and are connected to each other by base strut 30' located inside a recess 35 formed in centrifugal weight 2''' to which they are pivotally connected.

Lever arm extension 36 is mounted in the middle of strut 30' and is inclined slightly inward toward axis of rotation 6. Tension spring 16 is attached at one end to the outer end of lever arm extension 36. The other end of this spring is connected to adjacent centrifugal weight 2''' with spring 16 being positioned approximately tangentially. The other end of lever 29' is formed to define a hook 38 which engages pin 37. The pin 37 extends axially on both sides of adjacent centrifugal weight 2''' to which spring 16 of this lever 29' is attached. Pin 37 is positioned parallel to the axis of rotation 6 and is fixedly attached to centrifugal weight 2'''. The leg ends of lever 29' extend outwardly in the radial direction and define hook 38 which engages pin 37. Each lever 29' extends from the location of pivot pin 28 approximately tangentially and slightly radially outwardly in the direction of pin 37. In the other direction, the lever runs inwardly from its pivot location at pin 28 with radial and tangential components of direction.

The action of the restraining devices formed by levers 29′, pins 37 and tension springs 16 is similar to that of the embodiment of FIGS. 6 and 7. As the speed increases, centrifugal weights 2‴ are held by spring-loaded levers 29′ until the centrifugal force of centrifugal weights 2‴ is greater than the holding force of the levers, so that the centrifugal weights move suddenly out at an increased speed and come into contact engagement with the inside of clutch drum 3. As the speed drops, the disengagement occurs just above the idling speed because the centrifugal weights are no longer loaded by the restraining device after they have previously overcome the latter in their outward movement. During disengagement with the drum, the centrifugal weights are loaded only by the force of springs 16.

After the centrifugal weights 2‴ have moved out, pins 37 are in contact with the approximately tangential end faces of hooks 38 of levers 29′. Accordingly, a return of centrifugal weights 2‴ into the initial position is assured and levers 29′ pivot back into the initial position shown in FIG. 8 as soon as the speed has dropped to the predetermined value. In this embodiment, the engaging speed can be maintained very precisely at a low manufacturing cost. Moreover, the construction is very robust and thus wear-resistant.

The number of centrifugal weights, their guidance on the carrier and the arrangement of the tension springs can be varied. Also, the centrifugal weights can be designed not directly as clutch jaws, as described, so that their centrifugal force is utilized solely for engagement.

It is understood that the foregoing description is that of the preferred embodiments of the invention and that various changes and modifications may be made thereto without departing from the spirit and scope of the invention as defined in the appended claims.

What is claimed is:

1. A centrifugal clutch for apparatus such as a motor-driven chain saw or the like, the centrifugal clutch comprising:

a carrier adapted to be rotatably driven about a rotational axis by the motor of the apparatus;

an output member arranged in surrounding relationship to said carrier;

a plurality of centrifugal weights mounted on said carrier so as to be movable radially of said rotational axis between a rest position whereat said weights are disengaged from said output member and an active position whereat said weights are in contact engagement with said output member for transmitting torgue thereto from said carrier;

restraining means for restraining said weights to prevent their movement out of said rest position until after a predetermined value of force on said weights is exceeded;

tension spring means for said centrifugal weights into their respective rest positions;

radial guide means for radially guiding said centrifugal weights on said carrier so as to move against the force of said springs means from said rest position whereat said weight is disengaged from said clutch drum and an active position whereat said weights are in contact engagement with said clutch drum;

said tension means including a plurality of springs corresponding to respective ones of said centrifugal weights; and, said restraining means including: a plurality of levers pivotally mounted on corresponding ones of said centrifugal weights, each of said levers having two lever arms having respective outer ends; each one of said springs having one end connected to the outer end of one lever arm of one of said levers and an other end of said one spring being connected to the centrifugal weight directly adjacent the centrifugal weight on which said one lever is pivotally mounted; and, releasable latching means for latching the other arm of said one lever to said centrifugal weight directly adjacent the centrifugal weight on which said one lever is pivotally mounted until said predetermined value of force is exceeded.

2. The centrifugal clutch of claim 1, said releasable latching means including a latching pin mounted on said directly adjacent centrifugal weight; and, a hook formed on the outer end of the other arm of said one lever for engaging said latching pin in force-tight engagement under the force of said one spring, said latching pin and the pivot axis of said one lever both being parallel to said rotational axis.

3. The centrifugal clutch of claim 2, said levers and said springs conjointly defining a common plane transverse to said rotational axis, said springs being approximately tangent to an imaginary circle having its center on said rotational axis.

4. The centrifugal clutch of claim 2, said centrifugal weights having respective first side faces defining a first plane transverse to said rotational axis and said centrifugal weights having respective second side faces defining a second plane also transverse to said rotational axis; said first and second planes conjointly defining a space therebetween; and, said restraining means being disposed in said space between said first and second planes.

5. The centrifugal clutch of claim 1, each one of said levers having U-shaped section defining a base and two legs extending from said base, said one lever being mounted on the centrifugal weight corresponding thereto so as to cause said legs to straddle the weight on which it is pivotally mounted and the centrifugal weight directly adjacent to the weight on which the lever is pivotally mounted.

6. The centrifugal clutch of claim 5, said one lever arm having a lever arm extension mounted on said base, said lever arm extension defining said outer end, the spring connected to said one lever being connected to said outer end.

7. The centrifugal clutch of claim 1, said releasable latching means including: a recess formed in said directly adjacent centrifugal weight; and, a nose-like projection formed on the other arm of said one lever for engaging said recess during the rest position of said centrifugal weights.

8. The centrifugal clutch of claim 7, said directly adjacent weight having a side facing toward said rotational axis; said recess being formed in said side; and, said nose-like projection being formed on said other lever arm so as to face away from said rotational axis; and, the pivot axis of said one lever being parallel to said rotational axis.

* * * * *

UNITED STATES PATENT AND TRADEMARK OFFICE
CERTIFICATE OF CORRECTION

PATENT NO. : 4,819,779

DATED : April 11, 1989

INVENTOR(S) : Hans Nickel, Michael Wissmann and Horst Scholz

It is certified that error appears in the above-identified patent and that said Letters Patent is hereby corrected as shown below:

In column 9, line 55: delete "torgue" and substitute -- torque -- therefor.

In column 9, line 61: insert -- biasing -- between "for" and "said".

Signed and Sealed this

Thirty-first Day of October, 1989

Attest:

DONALD J. QUIGG

*Attesting Officer*   *Commissioner of Patents and Trademarks*